(12) United States Patent
Cheng

(10) Patent No.: US 6,431,033 B1
(45) Date of Patent: Aug. 13, 2002

(54) QUICK ADJUSTING DEVICE FOR A CUTTING OR WRENCHING TOOL

(76) Inventor: Sung-Wan Cheng, No. 460, Chien Cheng Road, Tai Ping City, Taichung Hsien (TW)

( * ) Notice: Subject to any disclaimer, the term of this patent is extended or adjusted under 35 U.S.C. 154(b) by 0 days.

(21) Appl. No.: 09/799,297

(22) Filed: Mar. 5, 2001

(51) Int. Cl.[7] .............................................. B25B 13/12
(52) U.S. Cl. ........................................ 81/133; 81/182
(58) Field of Search ................................. 81/133, 180.1, 81/181, 182; 7/142

(56) References Cited

U.S. PATENT DOCUMENTS

| 290,106 A | * 12/1883 | Port .......................... 81/181 X |
| 1,460,294 A | * 6/1923 | Wegner ..................... 81/133 X |
| 1,745,224 A | * 1/1930 | Magner ..................... 81/133 X |
| 4,942,790 A | * 7/1990 | Wang ......................... 81/133 |

* cited by examiner

*Primary Examiner*—James G. Smith
(74) *Attorney, Agent, or Firm*—Alan Kamrath; Rider, Bennett, Egan & Arundel, LLP

(57) ABSTRACT

A tool comprises a handle, a fixed jaw securely mounted to the first end of the handle, and a movable jaw mounted to and slidable relative to the handle. The movable jaw includes an operative section for cooperating with an operative section of the fixed jaw. A ratchet wheel is rotatably mounted to the handle. A gear meshes with a rack of the movable jaw such that the gear is driven to urge the movable jaw to move with respect to the fixed jaw when the ratchet wheel is turned. The operative section of the movable jaw is moved toward the operative section of the fixed jaw when the ratchet wheel is turned in a direction. The operative section of the movable jaw is moved away from the operative section of the fixed jaw when the ratchet wheel is turned in a reverse direction.

15 Claims, 12 Drawing Sheets

US 6,431,033 B1

QUICK ADJUSTING DEVICE FOR A CUTTING OR WRENCHING TOOL

BACKGROUND OF THE INVENTION

1. Field of the Invention

The present invention relates to a quick adjusting device for a cutting or wrenching tool, and more particularly to a quick adjusting device employing a catch and a ratchet wheel for adjusting a distance between a fixed jaw and a movable jaw of a tool for cutting or wrenching objects.

2. Description of the Related Art

FIG. 11 of the drawings illustrates a conventional adjustable wrench that includes a handle 30' With a first jaw 33' securely attached to an end thereof The handle 30' includes an elongated slot 34' therein and a plurality of teeth 38' on a lateral side thereof. The adjustable wrench further includes a substantially L-shape jaw member 40' having a relatively longer portion in which an elongated slot 44' is defined and a relatively shorter portion to which a second jaw 43' is securely attached. A fence member 47' is formed on an outer lateral side of the jaw member 40'. A positioning member 48' is mounted in an area defined by the fence member 47' and includes a toothed portion 482' on a side thereof. The toothed portion 482' of the positioning member 48' is biased by springs 472' to engage with the teeth 38' of the handle 30', thereby retaining the second jaw 43' of the jaw member 40' in place with respect to the first jaw 33'. Referring to FIGS. 13 and 14, when it is desired to adjust the relative position between the second jaw 43' and the first jaw 33', the user grasps lugs 483' and 484' (FIG. 12) on the positioning member 48' and moves the positioning member 48' away from the handle 30'. The toothed portion 482' of the positioning member 48' is disengaged from the teeth 38' of the handle 30', thereby allowing sliding movement of the first jaw 33' relative to the jaw member 40' along a longitudinal direction of the handle 30' until the first jaw 33' reaches the desired position. The positioning member 48' is then released to retain the jaw member 40' in place. A pin 403' is extended through the elongated slot 44' of the jaw member 40' and an opening in the handle 30' and a similar pin is extended through an opening 402' of the jaw member 40' and the elongated slot 34' of the handle 30' to guide sliding movement of the handle 30' relative to the jaw member 40'.

Nevertheless, it is inconvenient for the user to grasp the lugs 483' and 484' and move the positioning member 48' away from the handle 30'. In addition, the sliding range of the handle 30' relative to the positioning member 48' is limited by the length of the toothed portion 482'. More particularly, the positioning member 48' will have a firm engaging effect with the teeth 38' of the handle 30' if the toothed portion 482' is longer; yet this not only causes an increase in the cost but also shortens the travel of the handle 30' and thus limits the sizes of the objects that can be clamped between the first jaw 33' and the second jaw 43'. On the contrary, if the length of the toothed portion 482' is shortened to increase the allowed travel of the positioning member 48', the engagement between the toothed portion 482' and the teeth 38' of the handle 30' is insufficient to firmly clamp an object (such as a nut or bolt) that requires a tight engagement during tightening or loosening. The torque-bearing capacity of the wrench is also reduced.

SUMMARY OF THE INVENTION

A tool in accordance with the present invention comprises:

a handle having a first end and a second end for grasp;

a fixed jaw; securely mounted to the first end of the handle and including an operative section;

a movable jaw mounted to and slidable relative to the handle, the movable jaw including an operative section for cooperating with the operative section of the fixed jaw, the movable jaw further including a rack formed thereon, a positioning means including a ratchet wheel rotatably mounted to the handle and a gear that meshes with the rack of the movable jaw, the gear being connected with the ratchet wheel such that the gear is driven to urge the movable jaw to move with respect to the fixed jaw when the ratchet wheel is turned;

wherein the operative section of the movable jaw is moved toward the operative section of the fixed jaw when the ratchet wheel is turned in a direction, and wherein the operative section of the movable jaw is moved away from the operative section of the fixed jaw when the ratchet wheel is turned in a reverse direction.

In an embodiment of the invention, the handle comprises a first handle piece and a second handle piece each having a first end and a second end. The fixed jaw is fixed between the first ends of the first handle piece and the second handle piece. A housing is attached to the second ends of the first handle piece and the second handle piece for grasping. The first handle piece comprises a catch pivotally mounted thereto, the catch having an end releasably engaged with the ratchet wheel for:preventing the ratchet wheel from being turned in the reverse direction. A biasing means is provided for biasing the end of the catch to engage with the ratchet wheel.

The fixed jaw comprises an end having two spaced lugs. The positioning means includes a shaft extending through the first end of the first handle piece, the lugs, and the first end of the second handle piece. The shaft has an end extending beyond the first handle. The ratchet wheel is securely mounted to the end of the shaft. The gear is securely mounted around a middle portion of the shaft that is located between the lugs.

The movable jaw is substantially L-shape and comprises a relatively short section on which the operative section is formed and a relatively longer section in which a slot is defined. The rack is formed on a lateral wall that defines a portion of the slot. The relatively longer section of the movable jaw is extended through a space between the lugs of the fixed jaw. The fixed jaw comprises a receptacle for receiving an elastic member for biasing the operative section of the fixed jaw and the operative section of the movable jaw away from each other. The fixed jaw comprises a transverse through-hole extending through the receptacle. The elastic member is a torsion spring having a coil portion. A pin extends through the transverse through-hole and the coil portion of the torsion spring.

The fixed jaw further comprises a screw hole for receiving a piercing member therein. Each of the operative sections of the fixed jaw and the movable jaw is a clamping section in the form of a plurality of teeth to act as a wrench. In another embodiment, the operative section of the fixed jaw is a cutter and the operative section of the movable jaw includes two rollers to form a pipe cutter.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
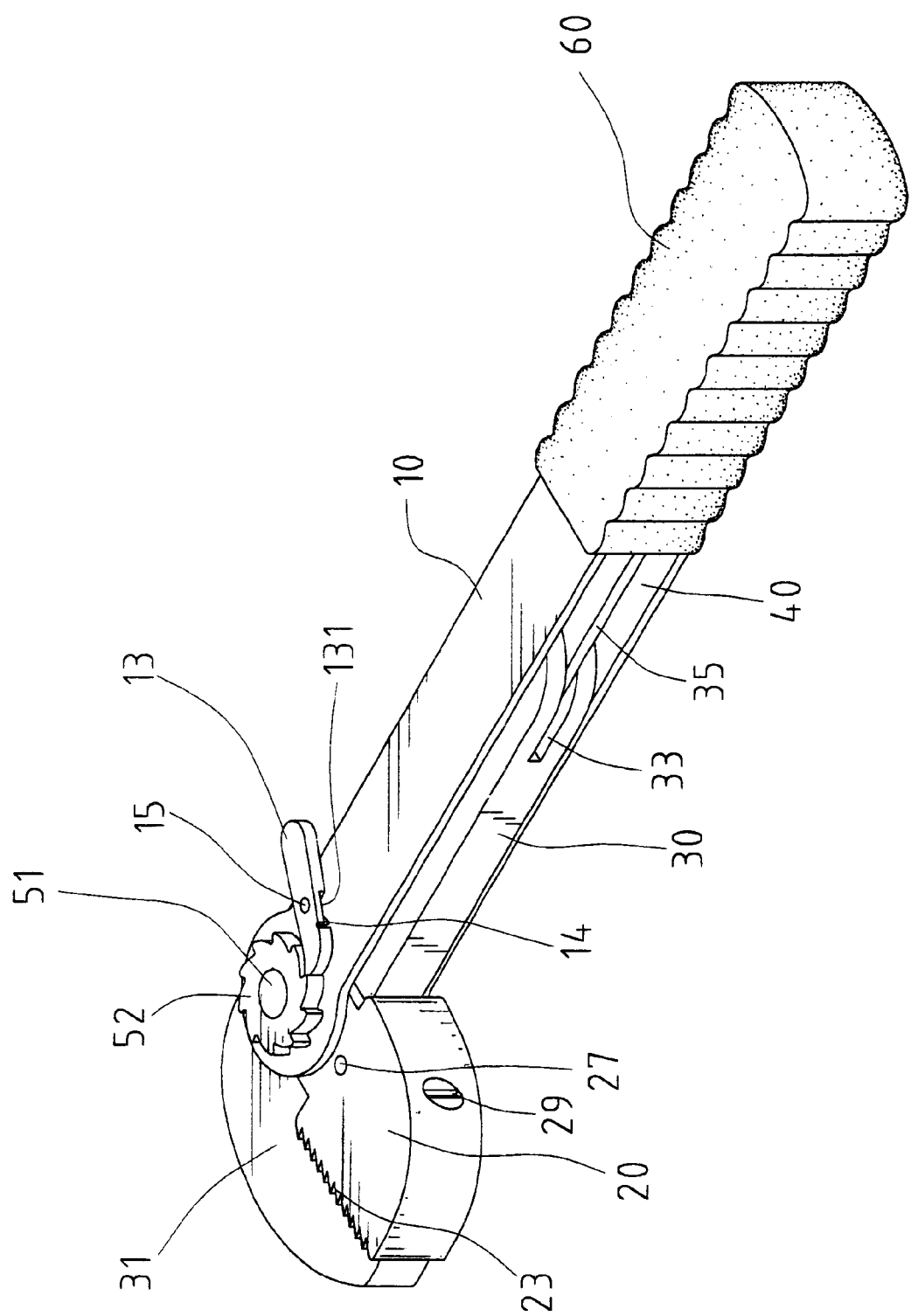
FIG. 1 is a perspective view of an adjustable wrench with a quick adjusting device in accordance with the present invention.
Figure 2:
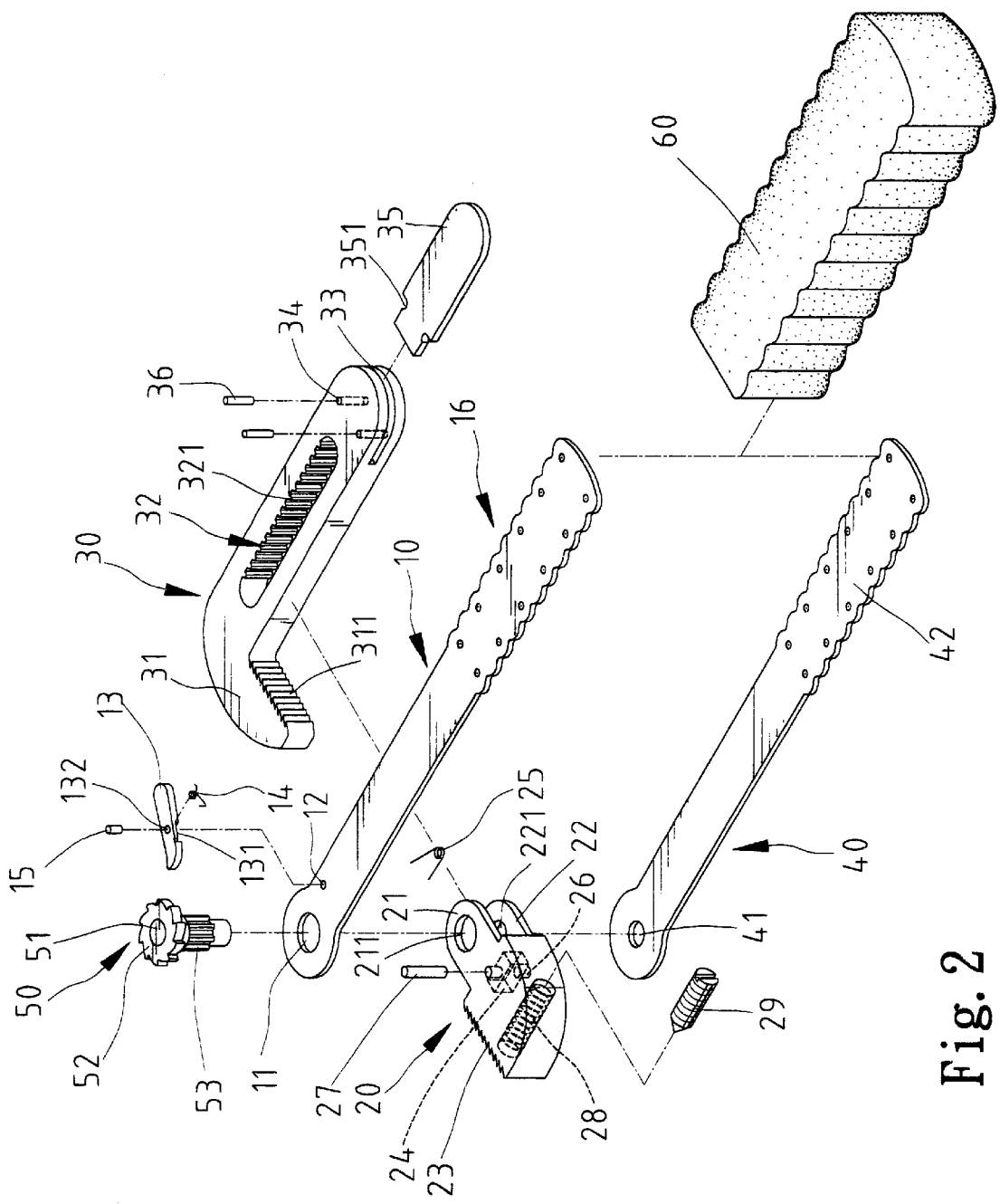
FIG. 2 is an exploded perspective view of the adjustable wrench in FIG. 1.
Figure 3:
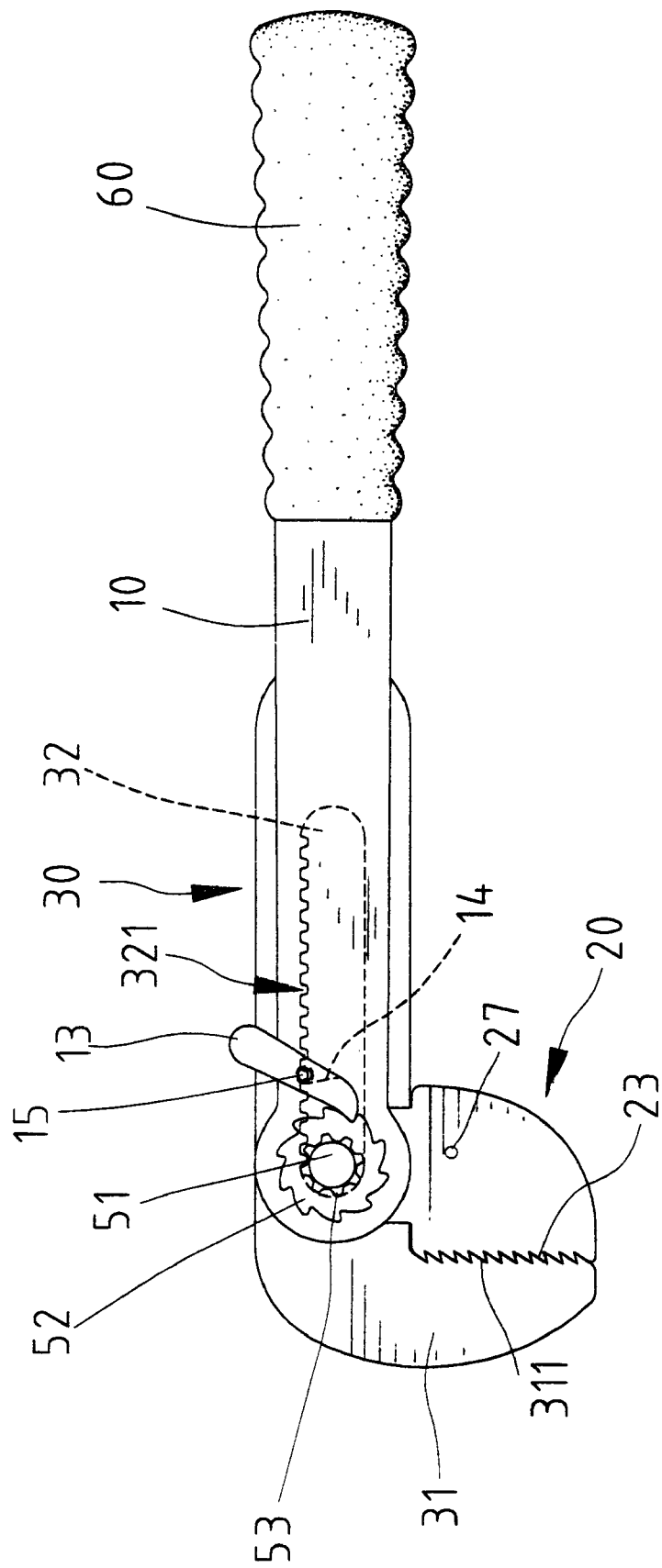
FIG. 3 is a top view of the adjustable wrench in FIG. 1.

Referring to FIGS. 1 through 10 and initially to FIGS. 1 through 3, a tool (e.g., a wrench) in accordance with the present invention generally includes a handle consisting of a first handle piece 10 and a second handle piece 40. The first handle piece 10 includes a first end (preferably round) having a hole 11 and a second end 16 having a wave-like configuration on each of two lateral sides thereof. Similarly, the second handle 40 includes a first end (preferably round) having a hole 41 and a second end 42 having a wave-like configuration on each of two lateral sides thereof. A housing 60 is attached to and thus encloses second ends 16 and 42 of the handle pieces 10 and 40 for easy grasping.

The first end of the first handle piece 10 further includes a pivot hole 12 to which a catch 13 is pivotally mounted by means of extending a pin 15 through a pivot hole 132 in the catch 13 and the pivot hole 12. An elastic member 14 (such as a torsion spring) is mounted in a notch 131 of the catch 13 for biasing an end of the catch 13 to engage with a ratchet wheel 52 of a positioning means 50, which will be described in detail later.

A fixed jaw 20 is securely mounted between the first ends of the handle pieces 10 and 40. In this embodiment, the fixed jaw 20 includes a first end having two spaced lugs 21 and 22 and a second end having an operative section (e.g., a clamping section 23 in the form of a plurality of teeth). The lug 21 has a hole 211 having a diameter the same as that of the hole 11 of the first handle piece 10. The lug 22 has a hole 221 having a diameter that is smaller than the hole 211 and that is the same as that of the hole 41 of the second handle piece 40. The positioning means 50 includes a shaft 51 having a first end to which the ratchet wheel 52 is securely mounted. A gear 53 is securely mounted on a middle portion of the shaft 51. The first end of the first handle piece 10 and the lug 21 of the fixed jaw 20 are mounted between the ratchet wheel 52 and the gear 53 with a second end of the shaft 51 extending through the hole 221 in the lug 22 and the hole 41 of the second handle piece 40. Namely, the gear 53 is located between the lugs 21 and 22. The fixed jaw 20 further includes a receptacle 24 for receiving an elastic member (such as a torsion spring 25) and a transverse through-hole 26 that extends through the receptacle 24. A pin 27 is received in the transverse through-hole 26 and extends through a coil portion of the torsion spring 25. The fixed jaw 20 further includes a screw hole 28 for receiving a piercing member 29 having an outer threading (not labeled).

The wrench further includes a substantially L-shape movable jaw 30 having a relatively longer section in which a slot 32 is defined and a relatively shorter section 31 with an operative section (e.g., a clamping section 311 in the form of a plurality of teeth). The clamping section 311 of the movable jaw 30 cooperates with the clamping section 23 of the fixed jaw 20 for clamping an object for wrenching purposes. The relatively longer section of the movable jaw 30 is extended through the space between the lugs 21 and 22 of the fixed jaw 20 with the gear 53 meshing with a rack 321 formed on a lateral side defining a portion of the slot 32. An end of the torsion spring 25 is attached to the movable jaw 30 and the other end of the torsion spring 25 is attached to a wall of the fixed jaw 20, thereby biasing the clamping section 23 of the fixed jaw 20 and the clamping section 311 of the movable jaw 30 away from each other to prevent staggering when an object is clamped between the clamping section 23 of the fixed jaw 20 and the clamping section 311 of the movable jaw 30. The relatively longer section of the movable jaw 30 further includes a tongue 35 attached thereto. In this embodiment, a groove 33 is defined in a distal end of the relatively longer section for receiving an end of the tongue 35 with two positioning notches 351. Two transverse through-holes 34 are defined in the distal end of the relatively longer section of the movable jaw 30. Two pins 36 extend through transverse through-holes 34 and the positioning notches 351. Thus, the tongue 35 is fixed to the movable jaw 30 and forms an extension of the relatively longer section of the movable jaw 30.

Figure 4:
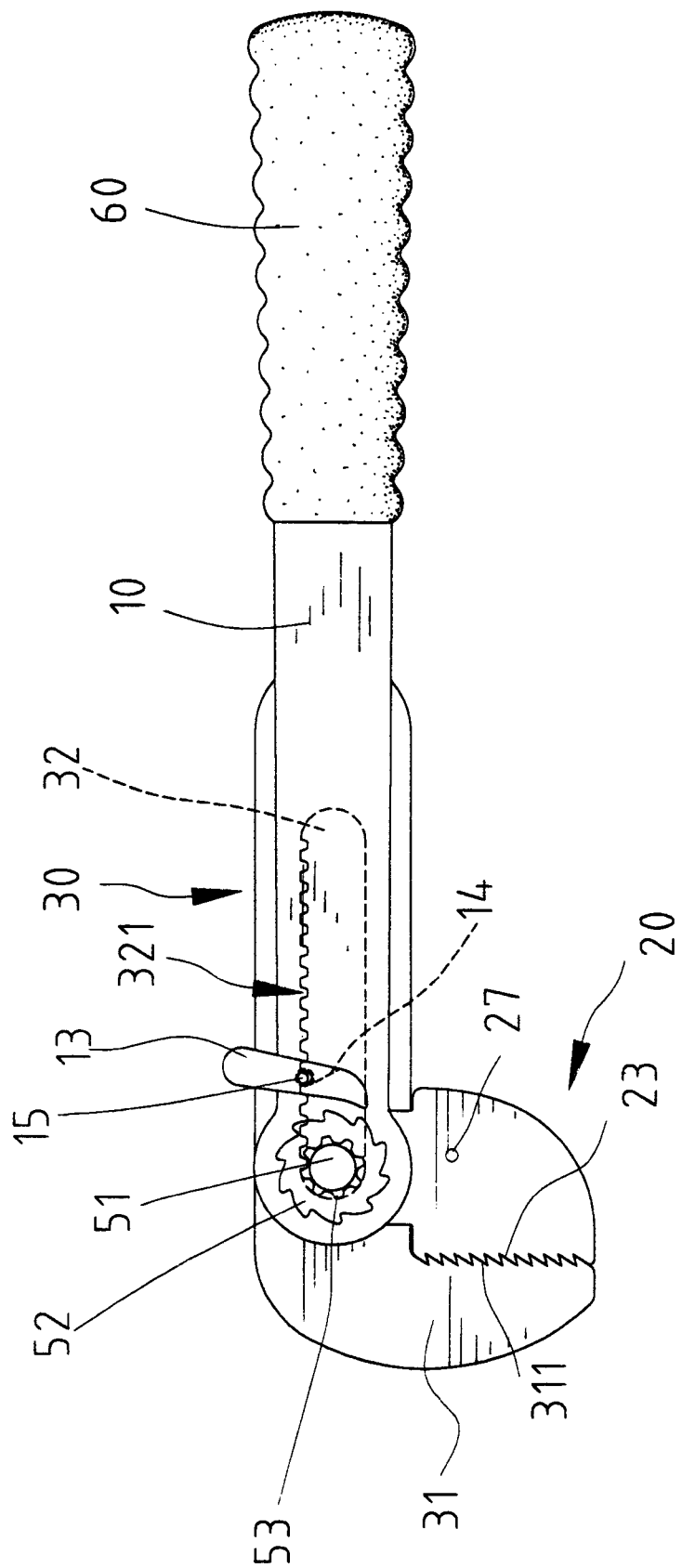
FIG. 4 is a top view similar to FIG. 3, wherein a catch is disengaged from a ratchet wheel to allow rapid adjustment of a distance between a fixed jaw and a movable jaw of the adjustable wrench.

When it is desired to clamp an object, the catch 13 on the first handle piece 10 of the wrench is pivoted from an engaged position shown in FIG. 3 to a position shown in FIG. 4. Namely, the catch 13 is disengaged from the ratchet wheel 52. The ratchet wheel 52 can be turned to move the movable jaw 30 toward or away from the fixed jaw 20 via transmission by the rack 321 of the movable jaw 30, thereby quickly adjusting the distance between the clamping section 311 of the movable jaw 30 and the clamping section 23 of the fixed jaw 20. When an object is held between the clamping section 23 of the fixed jaw 20 and the clamping section 311 of the movable jaw 30, the catch 13 is released to re-engage with the ratchet wheel 52, as shown in FIG. 5.

Figure 5:
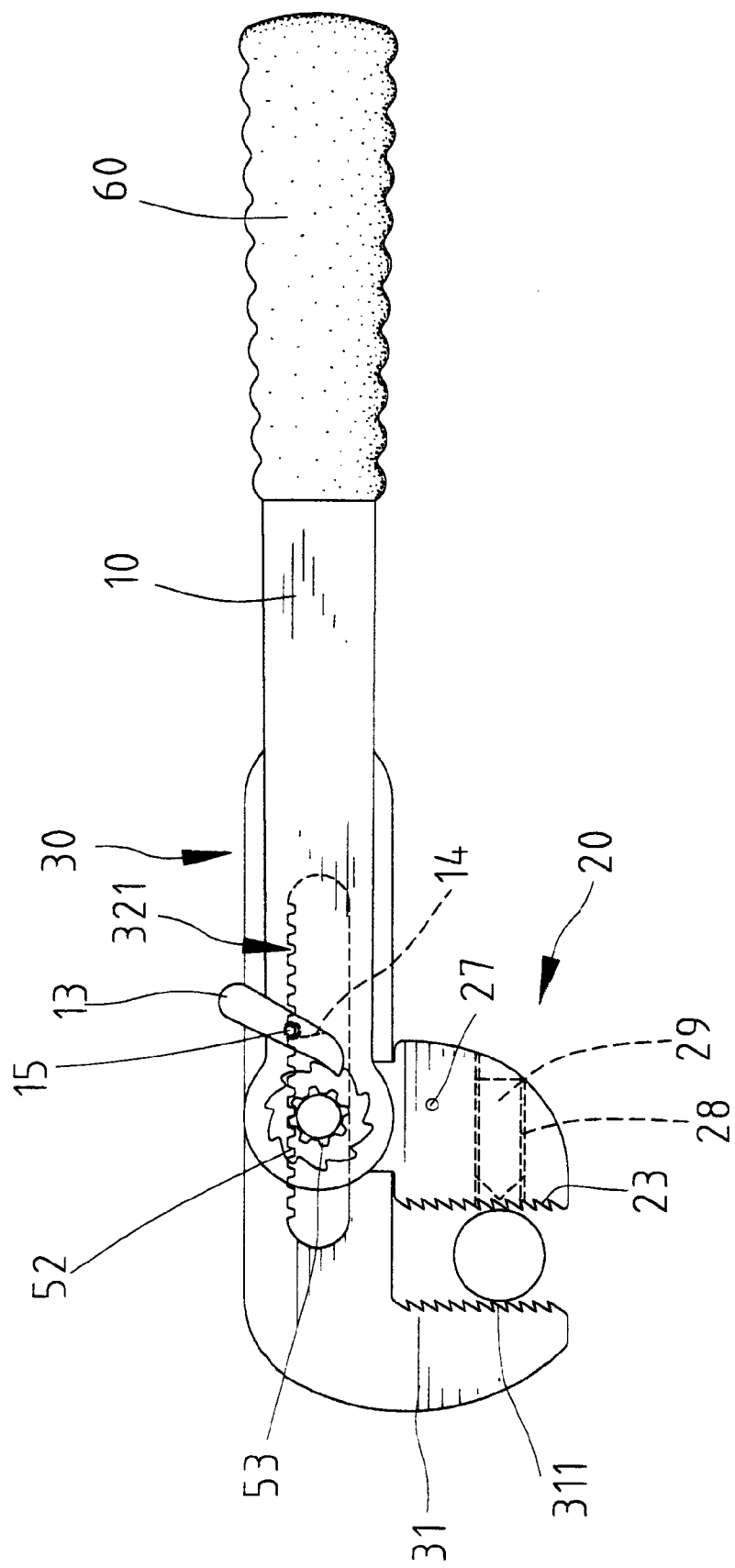
FIG. 5 is a top view similar to FIG. 3, illustrating use of the adjustable wrench.

It is noted that the ratchet wheel 52 in FIG. 5 can only be rotated in a direction (e.g., clockwise) to allow the clamping section 311 of the movable jaw 30 to move toward the clamping section 23 of the fixed jaw 20, thereby tightly clamping the object. Namely, after the catch 13 is engaged with the ratchet wheel 52, it is impossible for the clamping section 311 of the movable jaw 30 to move away from the clamping section 23 of the fixed jaw 20, thereby preventing the object from falling.

Figure 6:
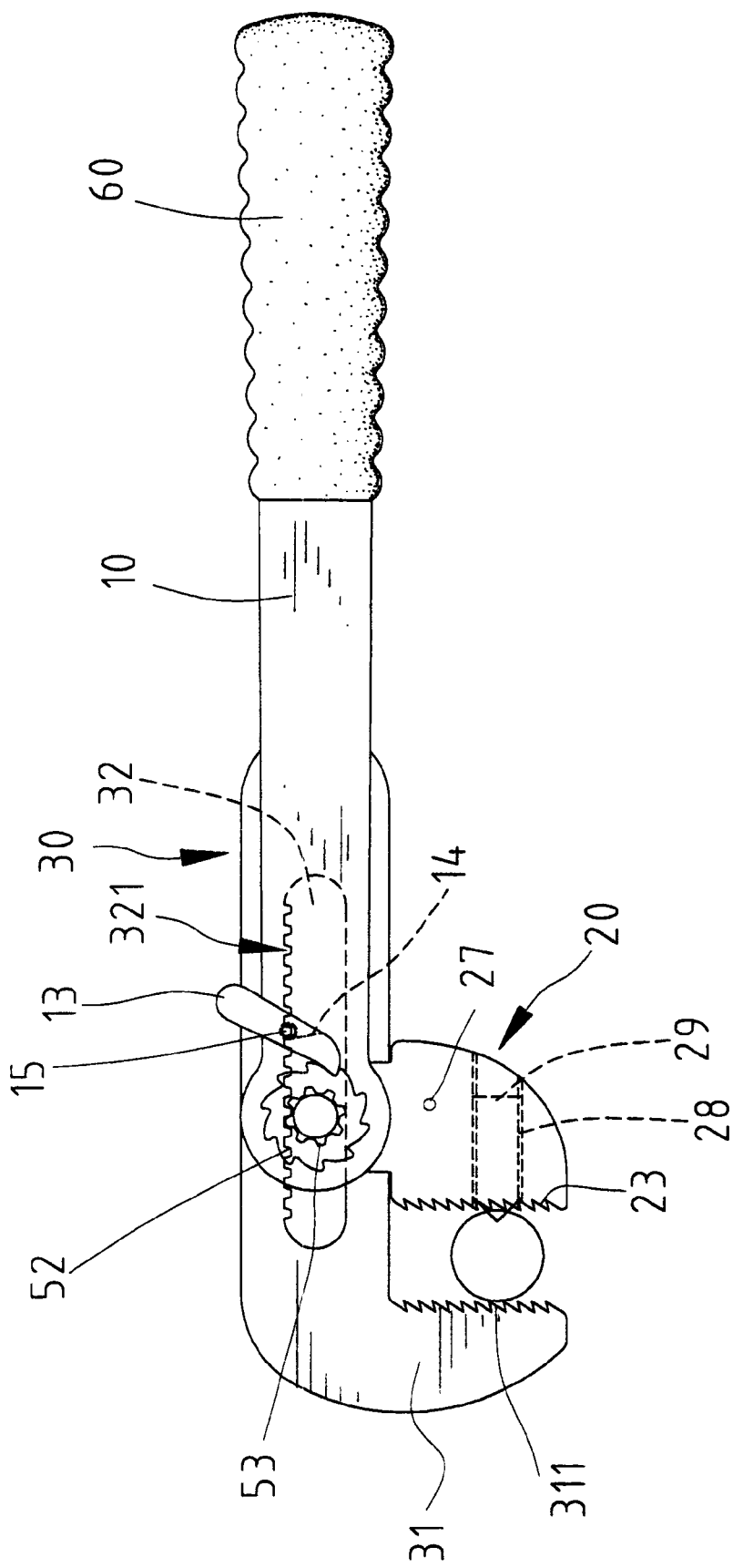
FIG. 6 is a top view similar to FIG. 5, illustrating another use of the adjustable wrench.

Referring to FIG. 6, in a case that the object (e.g., a drainage pipe) contains fluid to be drained, the user may use a tool to turn the piercing member 29 until the sharp end of the piercing member 29 pierces into the object for draining the fluid.

Figure 7:
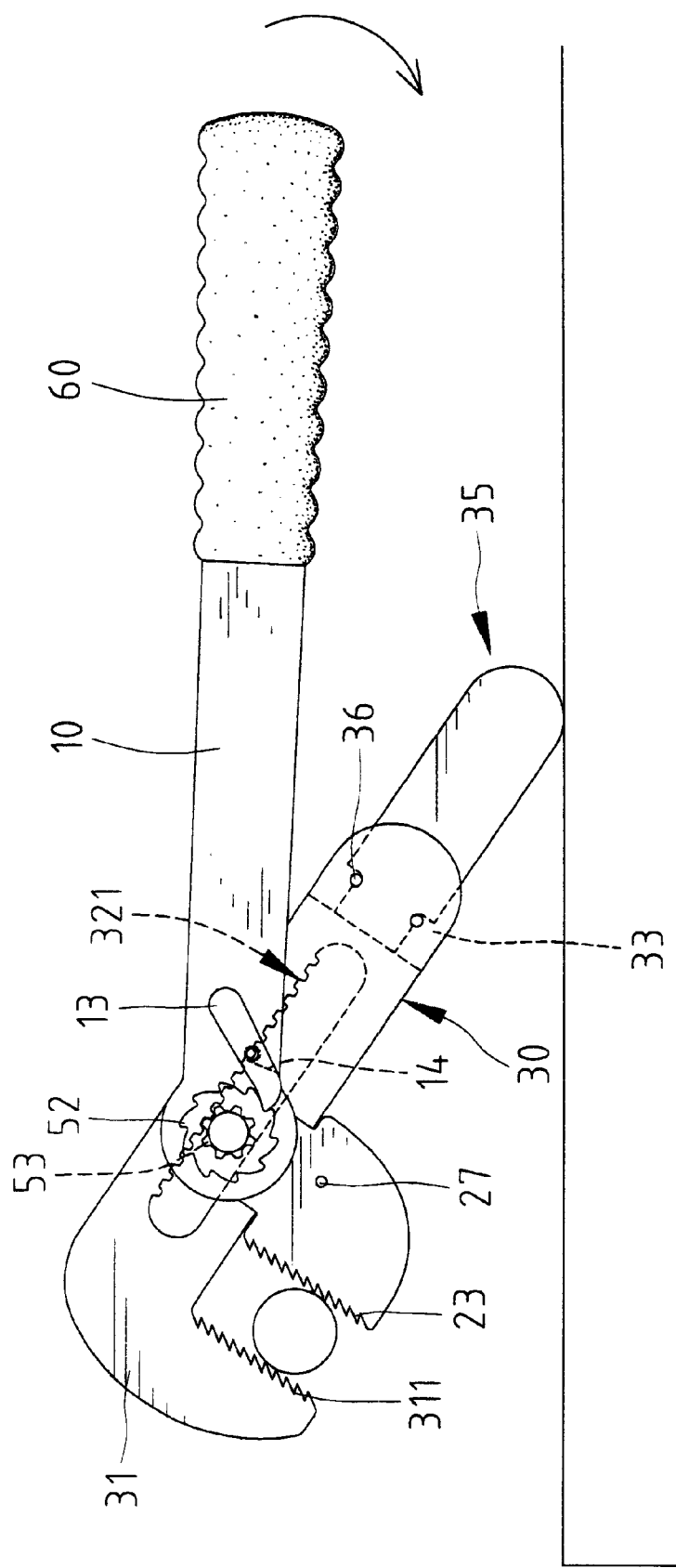
FIG. 7 is a top view similar to FIG. 5, illustrating use of an extension of the adjustable wrench.
Figure 8:
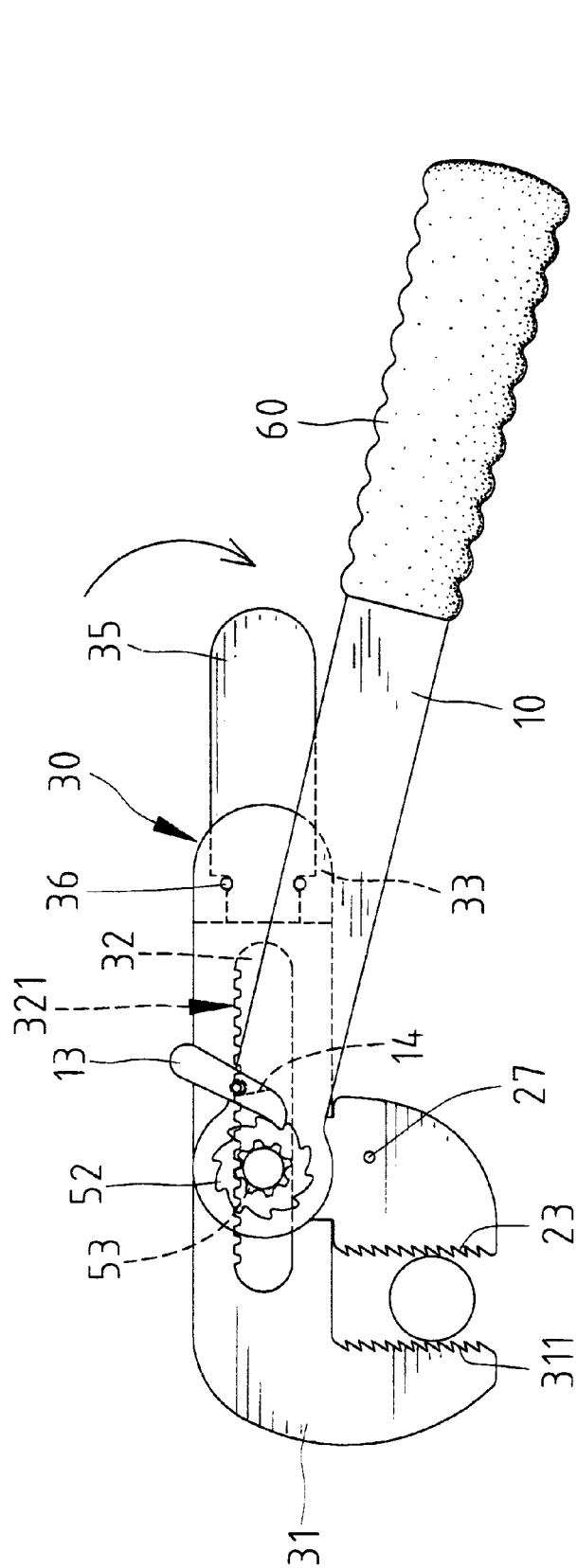
FIG. 8 is a top view similar to FIG. 5, illustrating operation of the adjustable wrench in a limited space.

Referring to FIG. 7, when in use, a distal end of the extension 35 (i.e., the tongue) can be abutted against a wall to act as a fulcrum and the user may operate the handle to obtain a higher wrenching force. When used in a small space, referring to FIG. 8, the user may operate the extension 35 to further turn the object through a small angle even when the handle has reached its limit.

Figure 9:
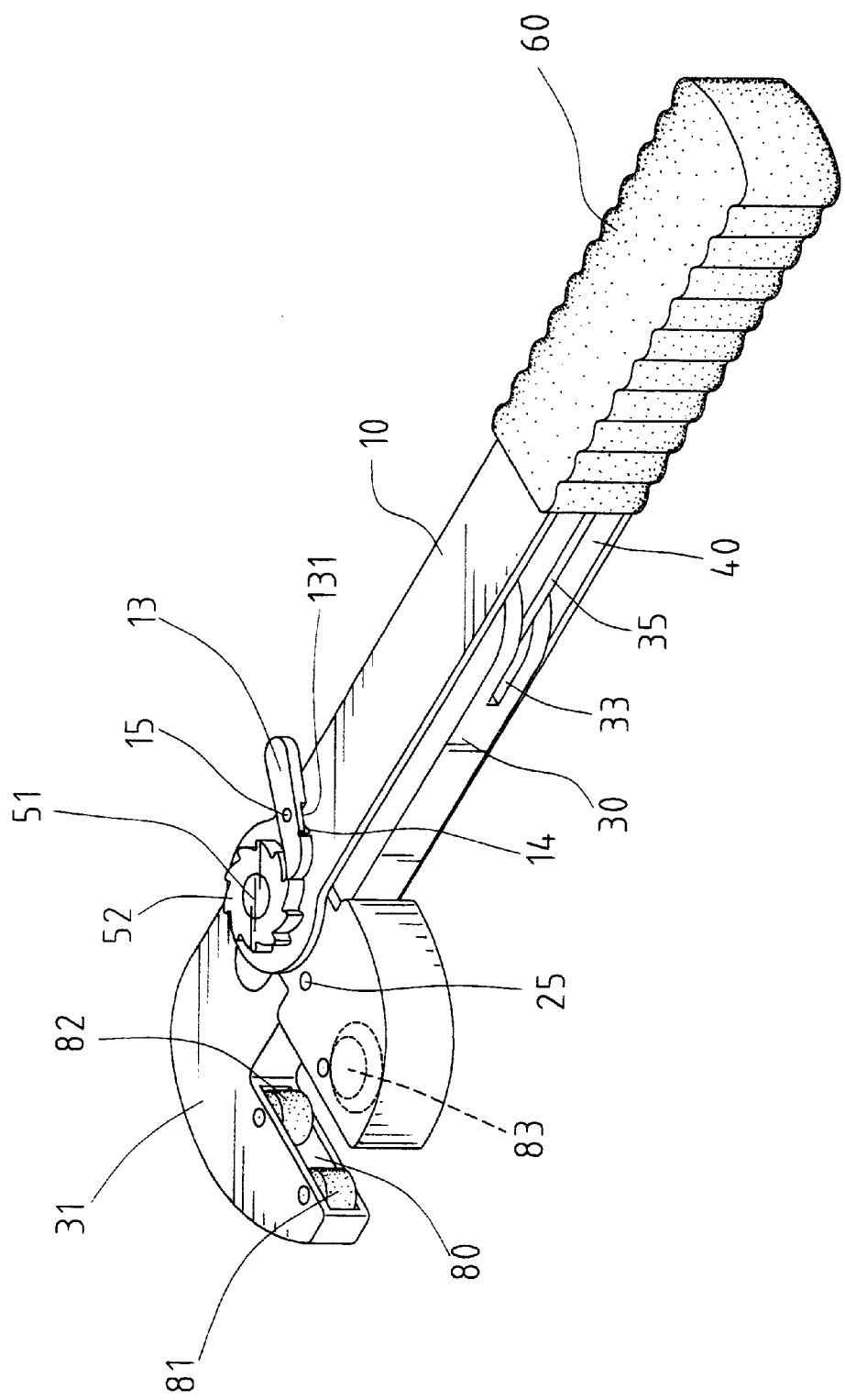
FIG. 9 is a perspective view of another type of wrench with the quick-adjusting device in accordance with the present invention.
Figure 10:
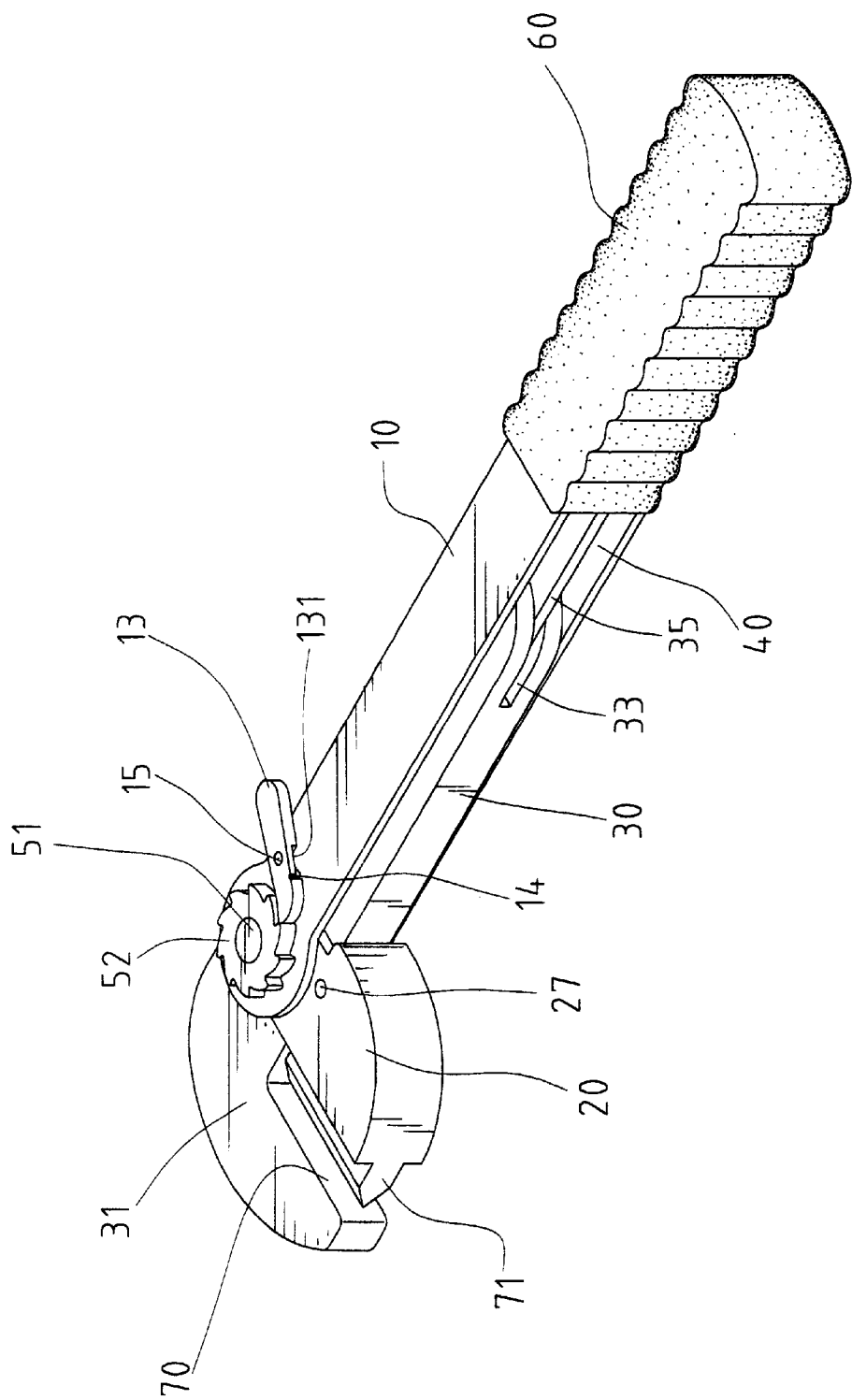
FIG. 10 is a perspective view of a pipe-cutting tool with the quick-adjusting device in accordance with the present invention.
Figures 11, 12:
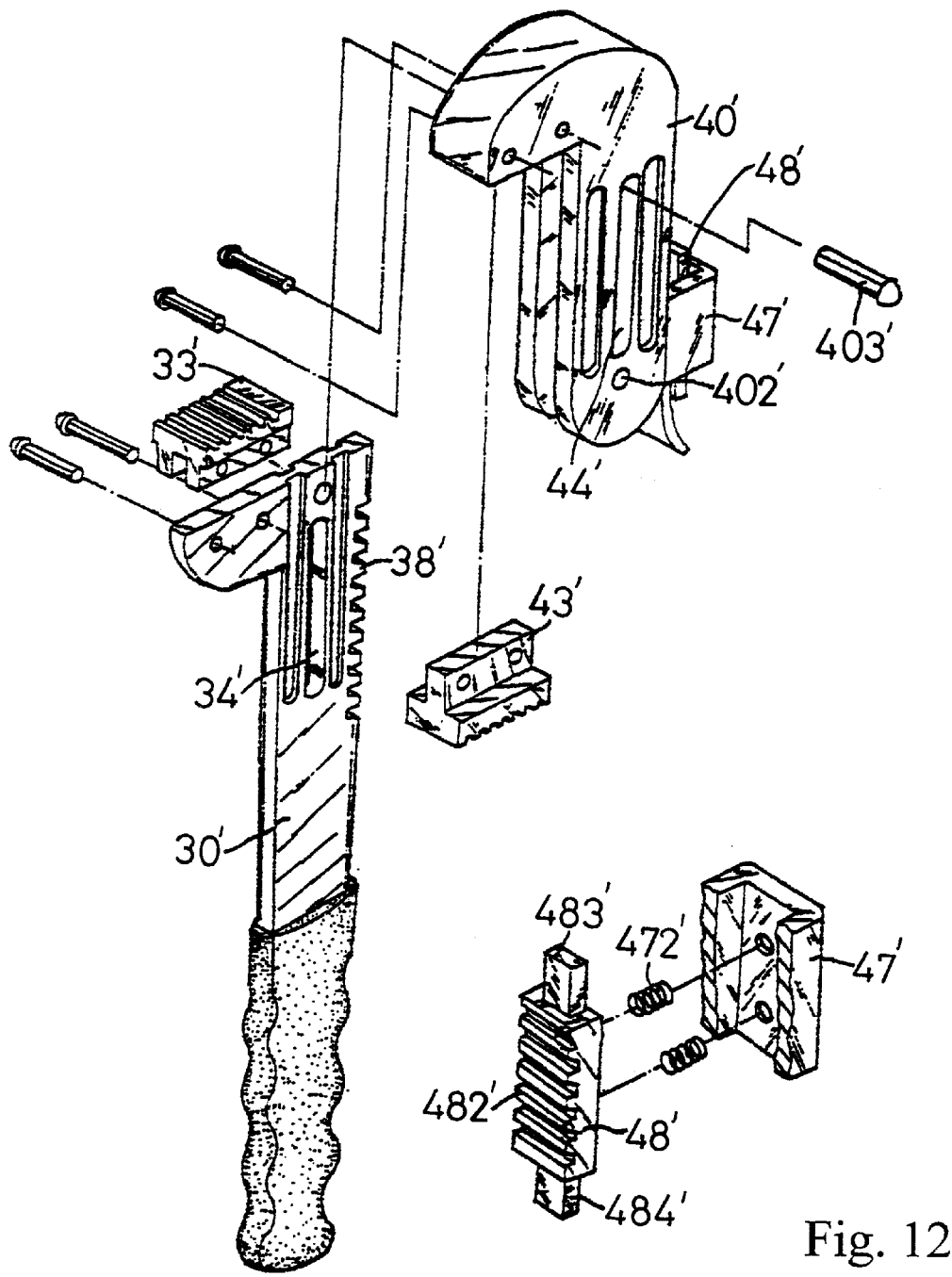
FIG. 11 is an exploded perspective view of a conventional adjustable wrench.
FIG. 12 is an exploded perspective view of a fence and a positioning member of the adjustable wrench in FIG. 11.
Figure 13:
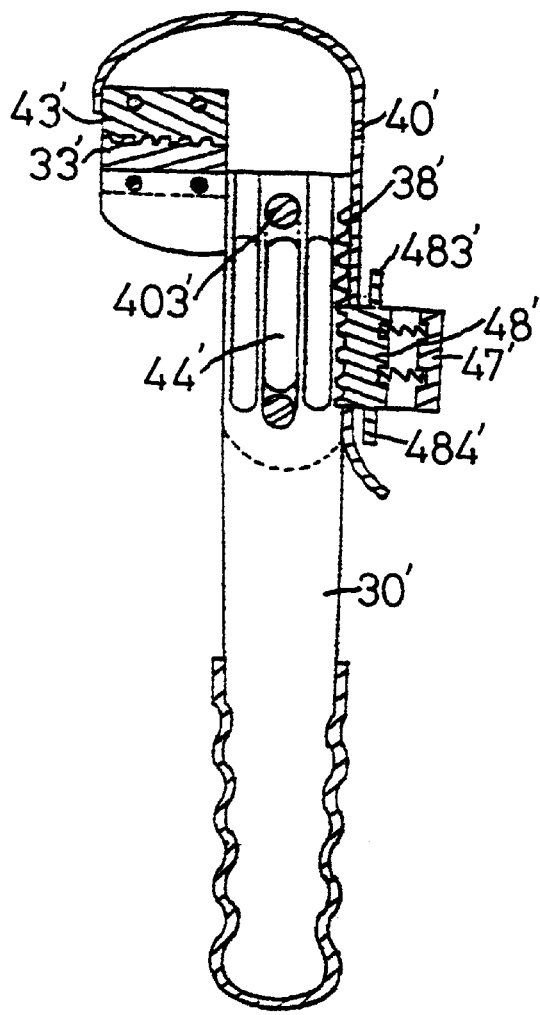
FIGS. 13 and 14 are sectional views illustrating operation of the adjustable wrench in FIG. 11.
Figure 14:
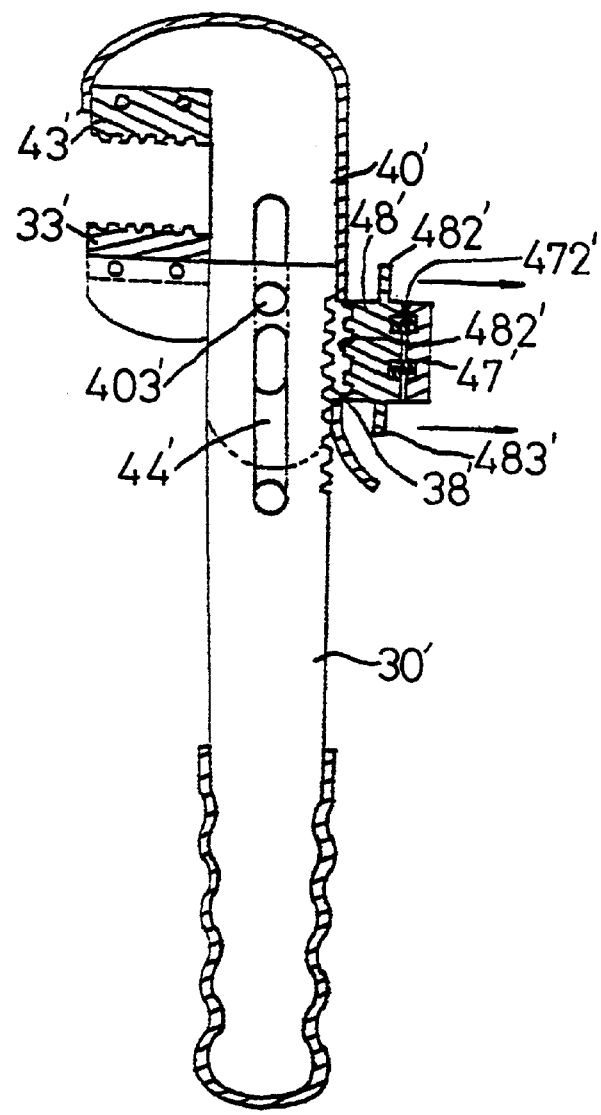

FIG. 10 illustrates a modified embodiment of the invention, wherein the operative section of the movable jaw 30 is in the form of a planar surface 70 and the operative section of the fixed jaw 20 is in the form of a chisel-like structure 71. FIG. 9 illustrates a further modified embodiment of the invention, wherein the operative section of the fixed jaw 20 is replaced by a cutter 83 and the operative portion of the movable jaw 30 is replaced by a contact means 80 including two contact rollers 81 and 82. Thus, the tool may act as a pipe cutter with a quick adjusting function provided by the positioning means 50 and the catch 13 in accordance with the present invention.

Although the invention has been explained in relation to its preferred embodiment, it is to be understood that many other possible modifications and variations can be made without departing from the scope of the invention as hereinafter claimed.

What is claimed is:

1. A tool comprising:

a handle having a first handle piece and a second handle piece, with each handle piece having a first end and a second end, with the second ends of the first handle piece and the second handle piece for grasping;

a fixed jaw including an operative section, with the fixed jaw being fixed between the first ends of the first handle piece and the second handle piece, with the fixed jaw defining an end having two spaced lugs;

a movable jaw mounted to and slidable relative to the handle, the movable jaw including an operative section for cooperating with the operative section of the fixed jaw, the movable jaw further including a rack formed thereon; and a positioning means including a ratchet wheel rotatably mounted to the handle and a gear that meshes with the rack of the movable jaw, the gear being connected with the ratchet wheel such that the gear is driven to urge the movable jaw to move with respect to the fixed jaw when the ratchet wheel is turned, the positioning means including a shaft extending through the first end of the first handle piece, the lugs, and the first end of the second handle piece, the shaft having an end extending beyond the first handle, the ratchet wheel being securely mounted to the end of the shaft, the gear being securely mounted around a middle portion of the shaft that is located between the lugs;

wherein the operative section of the movable jaw is moved toward the operative section of the fixed jaw when the ratchet wheel is turned in a first direction, and wherein the operative section of the movable jaw is moved away from the operative section of the fixed jaw when the ratchet wheel is turned in a reverse direction from the first direction.

2. The tool as claimed in claim 1, wherein the first handle piece comprises a catch pivotally mounted thereto, the catch having an end releasably engaged with the ratchet wheel for preventing the ratchet wheel from being turned in the reverse direction.

3. The tool as claimed in claim 2, further comprising means for biasing the end of the catch to engage with the ratchet wheel.

4. The tool as claimed in claim 3, wherein the movable jaw is substantially L-shape and comprises a relatively short section on which the operative section is formed and a relatively longer section in which a slot is defined, the rack being formed on a lateral wall that defines a portion of the slot.

5. The tool as claimed in claim 4, further comprising an extension extending from a distal end of the relatively longer section of the movable jaw.

6. The tool as claimed in claim 4, wherein the fixed jaw comprises a screw hole for receiving a piercing member.

7. The tool as claimed in claim 4, wherein the fixed jaw comprises a receptacle for receiving an elastic member for biasing the operative section of the fixed jaw and the operative section of the movable jaw away from each other, wherein the receptacle is open on a side facing the relatively longer section of the movable jaw and the elastic member extends from the receptacle to contact the relatively longer section of the movable jaw.

8. The tool as claimed in claim 7, wherein the fixed jaw comprises a transverse through-hole extending through the receptacle, the elastic member being a torsion spring having a coil portion, with the tool further comprising a pin extending through the transverse through-hole and the coil portion of the torsion spring, thus securing the torsion spring within the receptacle.

9. The tool as claimed in claim 1, further comprising an extension extending from the movable jaw.

10. The tool as claimed in claim 2, further comprising an extension extending from the movable jaw.

11. The tool as claimed in claim 1, further comprising a housing attached to the second ends of the first handle piece and the second handle piece for grasping.

12. The tool as claimed in claim 4, wherein the relatively longer section of the movable jaw is extended through a space between the lugs of the fixed jaw.

13. The tool as claimed in claim 1, wherein the fixed jaw further comprises a screw hole for receiving a piercing member therein.

14. The tool as claimed in claim 1, wherein each of the operative sections of the fixed jaw and the movable jaw is a clamping section in the form of a plurality of teeth.

15. The tool as claimed in claim 1, wherein the operative section of the fixed jaw is a cutter and the operative section of the movable jaw includes two rollers to form a pipe cutter.

* * * * *